United States Patent
Murray et al.

(10) Patent No.: US 10,794,686 B2
(45) Date of Patent: Oct. 6, 2020

(54) APPARATUS AND METHODS FOR MEASURING BELTS

(71) Applicant: Laitram, L.L.C., Harahan, LA (US)

(72) Inventors: William S. Murray, New Orleans, LA (US); Jason Lagneaux, River Ridge, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 16/480,052

(22) PCT Filed: Jan. 24, 2018

(86) PCT No.: PCT/US2018/015062
§ 371 (c)(1),
(2) Date: Jul. 23, 2019

(87) PCT Pub. No.: WO2018/148014
PCT Pub. Date: Aug. 16, 2018

(65) Prior Publication Data
US 2019/0368862 A1    Dec. 5, 2019

Related U.S. Application Data

(60) Provisional application No. 62/456,875, filed on Feb. 9, 2017.

(51) Int. Cl.
*G01B 11/14* (2006.01)
*B65G 15/30* (2006.01)
(Continued)

(52) U.S. Cl.
CPC .............. *G01B 11/14* (2013.01); *B65G 15/30* (2013.01); *G01B 7/042* (2013.01); *G01B 11/043* (2013.01); *G01P 3/68* (2013.01)

(58) Field of Classification Search
CPC ...... G01B 11/14; G01B 7/042; G01B 11/043; B65G 15/30; G01P 3/68
See application file for complete search history.

(56) References Cited

U.S. PATENT DOCUMENTS 4,106,005 A * 8/1978 Asakawa ............... B65G 43/02
198/810.02
4,274,783 A * 6/1981 Eineichner ........... G01B 11/043
198/349.95
(Continued)

FOREIGN PATENT DOCUMENTS

DE    102005037117 A1    5/2006
GB      2377918 B        1/2006
(Continued)

OTHER PUBLICATIONS

OMC Technical Brief—Single point optical triangulation, Optical Metrology Centre, Essex, UK, 2001.

*Primary Examiner* — Steven Whitesell Gordon
(74) *Attorney, Agent, or Firm* — James T. Cronvich

(57) ABSTRACT

Apparatus and methods for determining belt speed and pitch using correlation techniques. The apparatus includes a pair of rangefinders separated by a predetermined distance. The rangefinders each measure the distance to the belt at two positions separated from each other in the direction of belt travel. The apparatus creates at least one time-series profile record corresponding to the profile of a belt. The time delays between occurrences of a regularly spaced topographical feature in the belt's profile are used by a processor to compute belt pitch and speed. Correlation techniques are used for robust results.

30 Claims, 3 Drawing Sheets

(51) Int. Cl.
*G01B 7/04* (2006.01)
*G01B 11/04* (2006.01)
*G01P 3/68* (2006.01)

(56) References Cited

U.S. PATENT DOCUMENTS

| | | | |
|---|---|---|---|
| 4,372,172 A * | 2/1983 | Gombocz | G01B 7/042 |
| | | | 198/810.04 |
| 4,409,852 A | 10/1983 | Suzuki et al. | |
| 5,291,131 A * | 3/1994 | Suzuki | G01B 7/042 |
| | | | 324/206 |
| 5,563,392 A | 10/1996 | Brown et al. | |
| 5,957,263 A | 9/1999 | Espenschied | |
| 6,047,814 A | 4/2000 | Alles et al. | |
| 6,275,171 B1 | 8/2001 | Waldman et al. | |
| 6,291,991 B1 | 9/2001 | Schnell | |
| 6,851,546 B2 | 2/2005 | Lodge | |
| 6,988,610 B2 | 1/2006 | Fromme et al. | |
| 7,540,374 B2 | 6/2009 | Rathbun et al. | |
| 9,014,482 B2 | 4/2015 | Kouno | |
| 9,730,456 B2 * | 8/2017 | Domenicucci | B65G 43/02 |
| 2003/0168317 A1 | 9/2003 | Fromme et al. | |
| 2004/0114951 A1* | 6/2004 | Kawagoe | G03G 15/162 |
| | | | 399/66 |
| 2004/0226805 A1 | 11/2004 | Lodge | |
| 2008/0047804 A1* | 2/2008 | Rathbun | B65G 43/02 |
| | | | 198/502.1 |
| 2011/0093218 A1* | 4/2011 | Vozner | G01B 11/028 |
| | | | 702/34 |
| 2014/0268093 A1 | 9/2014 | Tohme et al. | |
| 2016/0010977 A1* | 1/2016 | Frost | G01B 21/16 |
| | | | 702/34 |
| 2017/0030815 A1* | 2/2017 | Frost | G01N 3/56 |

FOREIGN PATENT DOCUMENTS

| | | |
|---|---|---|
| JP | 10332342 A | 12/1998 |
| WO | 2001-77614 A1 | 10/2001 |
| WO | 02079722 A1 | 10/2002 |
| WO | 03093783 A1 | 11/2003 |

* cited by examiner

APPARATUS AND METHODS FOR MEASURING BELTS

BACKGROUND

The invention relates generally to apparatus and methods for measuring conditions, such as the pitch or speed of belts or chains, by measuring the passage of topographical features in the profile of the belts or chains with distance measurements.

When transmission or conveyor belts or chains age, they stretch in the direction of belt travel. Stretching degrades the frictional engagement of a flat belt with its pulley or the positive engagement of a positively driven belt with the teeth of its drive sprocket. Stretching also presages belt failures due to aging. Because belt failures can be costly, a number of schemes for measuring belt stretch have been used. Many of those schemes require that special-purpose markers be added to a belt separated by a nominal distance. Detectors along the belt's travel path sense the passage of the markers and determine belt stretch from the times of passage. Conventional special-purpose markers serve no purpose other than as detectable position marks on a belt.

SUMMARY

One version of apparatus for measuring belts comprises and a processor receiving first distance measurements from a first rangefinder and producing a first profile record of a predetermined number of sequential first distance measurements and determining the occurrences of the regularly spaced topographical feature in the first profile record. The first rangefinder makes the first distance measurements from the first rangefinder to a belt having a regularly spaced topographical feature and advancing at a belt speed in a direction of belt travel transverse to the distance between the first rangefinder and the belt.

Another version comprises a first rangefinder and a second rangefinder. The first rangefinder makes first distance measurements to a belt having a regularly spaced topographical feature and advancing in a direction of belt travel transverse to the distance between the first rangefinder and the belt. The second rangefinder makes second distance measurements from the second rangefinder to the belt. The second rangefinder is offset from the first rangefinder in the direction of belt travel by a separation distance. A processor receives the first and second distance measurements, produces corresponding first and second records of a predetermined number of sequential first and second distance measurements, and produces a cross-correlation of the first record and the second record to determine a cross-correlation time delay between the occurrence of the topographical feature in the first record and the occurrence of the topographical feature in the second record.

In another aspect, a method for measuring belts comprises: (a) advancing a belt having a regularly spaced topographical feature in a direction of belt travel at a belt speed; (b) making first measurements constituting a profile of the belt along its length; (c) producing a first profile record of a predetermined number of sequential first measurements; and (d) determining the occurrences of the regularly spaced topographical feature in the first profile record.

DETAILED DESCRIPTION

Figure 1:
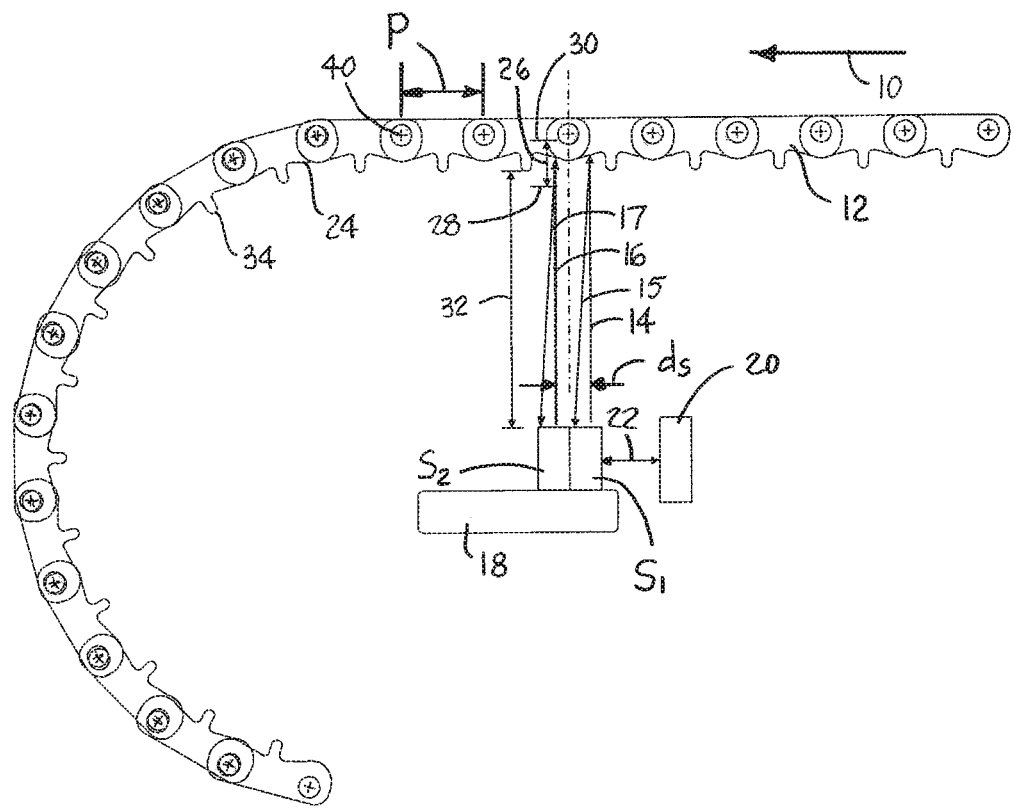
FIG. 1 is a schematic side elevation view of one end of a modular conveyor belt monitored by a distance-measuring apparatus embodying features of the invention.

One version of an apparatus embodying features of the invention for measuring belt speed and belt pitch is shown in FIG. 1. The apparatus comprises two sensors, rangefinders $S_1$, $S_2$, offset a predetermined distance in the direction of travel 10 along the length of a conveyor belt 12. The optical rangefinders $S_1$, $S_2$ in this version are laser rangefinders whose transmitted beams 14, 16 are separated by a separation distance $d_s$ parallel to the direction of belt travel 10. The rangefinders $S_1$, $S_2$ are mounted to a conveyor frame member 18 at a distance from the conveyor belt 12 transverse to the direction of belt travel 10. In this example the distance, measured along the transmitted laser beams 14, 16, is perpendicular to the direction of belt travel 10. When mounted with their beams parallel, the sensor spacing equals the separation distance $d_s$ of the two transmitted beams 14, 16. The beams 14, 16 each illuminate a spot on the belt 12. Reflected beams 15, 17 return to the rangefinders $S_1$, $S_2$, which have imagers, such as CCD arrays that detect the reflections, and signal conditioning and processing electronics that determine the ranges to the reflecting surfaces of the belt 12. The range measurements are sent to a processor 20 over a communications link 22. The processor 20 may be a general-purpose computer with data memory and program memory that is programmed to analyze the rangefinder's measurements. The processor 20 can also be programmed to control the sample rate of the rangefinders $S_1$, $S_2$ over the communications link 22.

The two parallel transmitted beams 14, 16 strike the conveyor belt 12 at two points separated by $d_s$ on a facing target surface 24 of the belt. The working range 26 of the rangefinders 14, 16 extends along their transmitted beam paths from the closest point of approach 28 to the farthest point of approach 30 of the target surface 24 of the belt 12. A standoff distance 32 extends from the rangefinders $S_1$, $S_2$ to a point within the working range 26. The rangefinders $S_1$, $S_2$ detect ranges to regularly spaced topographical features in a profile of the belt 12. In this example the regularly spaced topographical feature is a drive bar 34 that protrudes downward from belt's target surface 24. In this case the regularly spaced topographical feature 34 is an inherent feature of the belt 12 that has a main function; namely, engaging a drive sprocket that drives the belt on the drive bar 34. The drive bar 34 is not a feature whose sole purpose is to serve as a range marker to be measured by the rangefinder—although such dedicated-purpose features could be used. And the topographical features need not be protrusions, like the drive bar 34; they can be any regularly spaced features in the profile of the belt—including recesses. Thus, the rangefinding apparatus can be used with already existing belts having topographical features without adding a special-purpose marker, such as a magnet or a printed mark.

Figure 2:
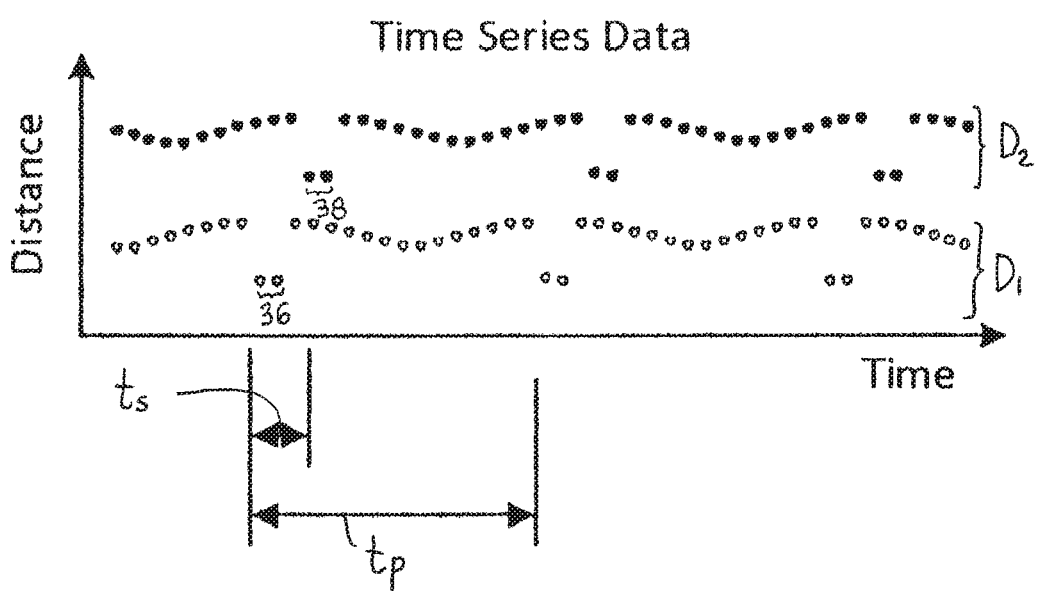
FIG. 2 is a plot of two sets of distance measurements made by the distance-measuring apparatus of FIG. 1.

FIG. 2 shows two sets of sampled distance measurements $D_1$, $D_2$ made by the two rangefinders $S_1$, $S_2$ of FIG. 1. The two sets of distance measurements are artificially offset from each other along the Distance axis in FIG. 2 to make them easier to see. The shape of the two time series $D_1$, $D_2$ corresponds to the profile of the target surface of the belt 12. Minimum values 36, 38 in the two time series of distance measurement data $D_1$, $D_2$ correspond to the regularly spaced features 34 on the belt 12. As FIG. 2 shows, the minimum distance values of the first rangefinder's profile record $D_1$ occur shortly before the second rangefinder's minima in its profile record $D_2$. The difference in time $t_s$ between these two minima is inversely proportional to the belt speed $v_b$. In fact, the belt speed $v_b$ can be computed using the sensor spacing $d_s$ as $v_b = d_s/t_s$. The time $t_p$ between consecutive minima in each rangefinder's time series is proportional to the distance $d_p$ between the positions of consecutive topographical belt features 34. If the belt speed $v_b$ is computed or is known a priori, that distance $d_p = v_b t_p$. But the distance $d_p$ between consecutive topographical features can also be computed without explicitly using belt speed as $d_p = d_s(t_p/t_s)$, where $t_p$ is determined directly from either one of the time series $D_1$, $D_2$ or by averaging the $t_p$ of both. If the regularly spaced feature 34 repeats at the belt pitch P, as in FIG. 1, $d_p$ can be used to measure belt pitch and, consequently, stretch (i.e., increase in belt pitch) over time. (For modular belts, the belt pitch P is defined as the distance between consecutive hinge axes 40.)

Figure 3:
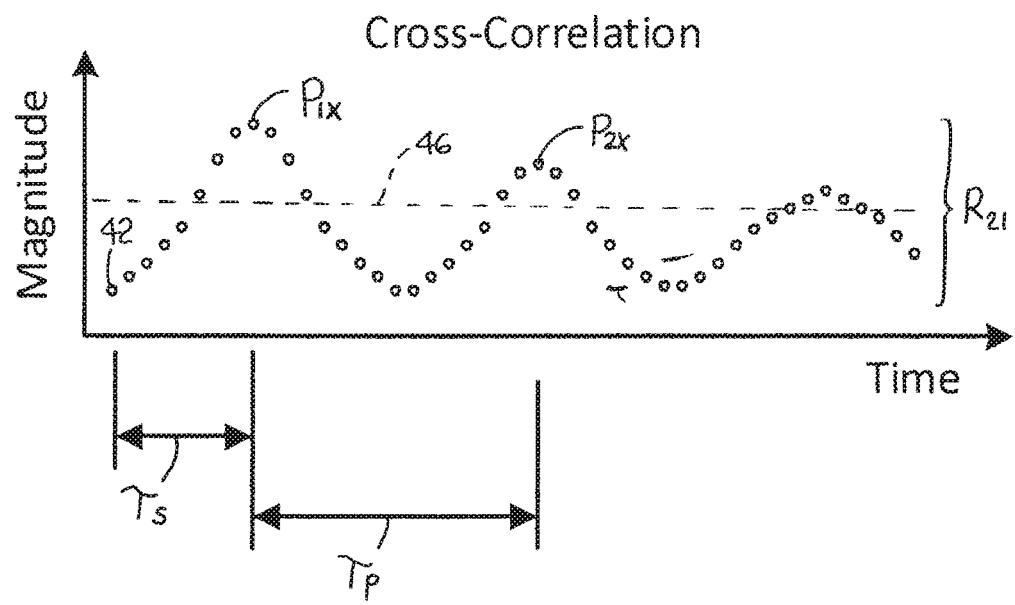
FIG. 3 is a cross-correlation of the two sets of distance measurements of FIG. 2.

Although the measurements of $t_s$ and $t_p$ from the time series $D_1$, $D_2$ may be accurate enough in some situations to determine belt speed and pitch, correlation techniques provide more robust measurements of time delays. Correlations are less susceptible to noise and other problems caused by belt wear, dirt accumulation, or time-series corruption that degrade time-delay measurements taken directly from time series. FIG. 3 shows the cross-correlation of the first and second rangefinder distance measurements $D_1$, $D_2$ of FIG. 2. For best correlation results, the length of each profile record $D_1$, $D_2$ includes at least two occurrences of the regularly spaced topographical feature. So the profile record lengths should be longer than twice the belt pitch at maximum stretch to guarantee that at least two occurrences of the regularly occurring topographical feature of interest appear in the profile records. The cross-correlation function $R_{21}$ is created by shifting $D_1$ to the right in FIG. 2 while $D_2$ is held stationary. The shifting is performed one measurement sample interval at a time. The cross-correlation value at each point in FIG. 3 is given by $R_{21}(l) = \Sigma_i d_2(i) d_1(i-l)$, where $d_1(i)$ are the individual distance measurements in the first rangefinder's profile record $D_1$, $d_2(i)$ are the individual distance measurements in the second rangefinder's profile record $D_2$, l is the shift of $D_1$ relative to $D_2$ in measurement sample intervals, and the summation for each l is summed for index i over the number of distance measurements in each profile record $D_1$, $D_2$. (The cross-correlation $R_{12}$ could alternatively be used.) The peaks of the cross-correlation provide a more accurate indication of the time delay than the peaks or edges of the times series $D_1$, $D_2$. The time delay $\tau_s$ from the first cross-correlation point 42 (corresponding to l=0) to the first cross-correlation peak $P_{1X}$ corresponds to is in FIG. 2 and is used to determine belt speed. The time delay $\tau_p$ between consecutive peaks, for example, between $P_{1X}$ and $P_{2X}$, corresponds to $t_p$ in FIG. 2 and can be used to measure belt pitch if belt speed is known a priori or has been calculated. Or belt pitch can be calculated as $d_p = d_s(\tau_p/\tau_s)$ without an intermediate calculation of belt speed. Both $\tau_s$ and $\tau_p$ are more robust measures than $t_s$ and $t_p$.

Figure 4:
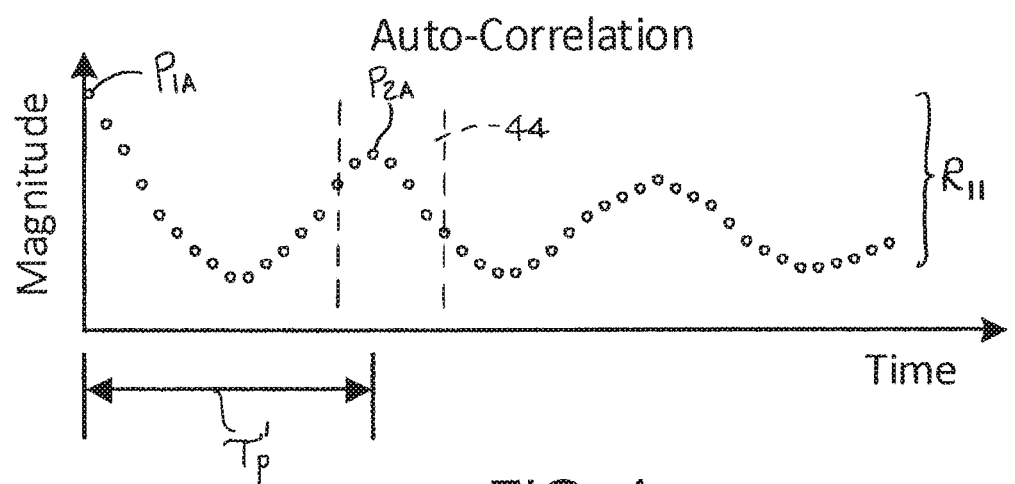
FIG. 4 is an auto-correlation of one of the two sets of distance measurements of FIG. 2.

The measurement of the time delay $\tau_p'$ between consecutive occurrences of the regularly spaced topographical feature in the first or second rangefinder's measurement data profile record $D_1$, $D_2$ can alternatively be computed with the auto-correlation of either or both records. FIG. 4 shows the auto-correlation $R_{11}$ of the first data profile record $D_1$. The auto-correlation $R_{11}$ is the correlation of profile record $D_1$ with itself. ($R_{22}$ is the auto-correlation of $D_2$.) The first and highest peak $P_{1A}$ occurs when $D_1$ is not shifted from itself (l=0). The next consecutive peak $P_{2A}$ occurs when the first occurrence of the minimum value in shifted profile record $D_1$ (FIG. 2) aligns with the second occurrence of the minimum value in unshifted profile record $D_1$. The time delay $\tau_p'$ between consecutive peaks $P_{1A}$, $P_{2A}$ in $R_{11}$ (or in $R_{22}$) can be used to measure belt pitch in the same way as $t_p$ and $\tau_p$.

Because the nominal pitch of the conveyor belt 12 is known and the belt speed is known or has been calculated, the auto-correlation does not have to be performed at every sample point. Instead, auto-correlation values outside a predetermined later region of interest 44 spanning the expected occurrence of the next peak after the peak $P_{1A}$ need not be computed. Searching for the peak $P_{2A}$ can be limited to auto-correlation values in that region of interest 44. Belts with small topographical features of interest result in auto-correlations with low signal-to-noise ratios. So searching for peaks only in a predetermined region of interest is necessary to avoid selecting an incorrect peak. A similar region of interest can also be applied to the time series $D_1$, $D_2$ if they are used directly to calculate pitch or belt speed.

Figure 5:
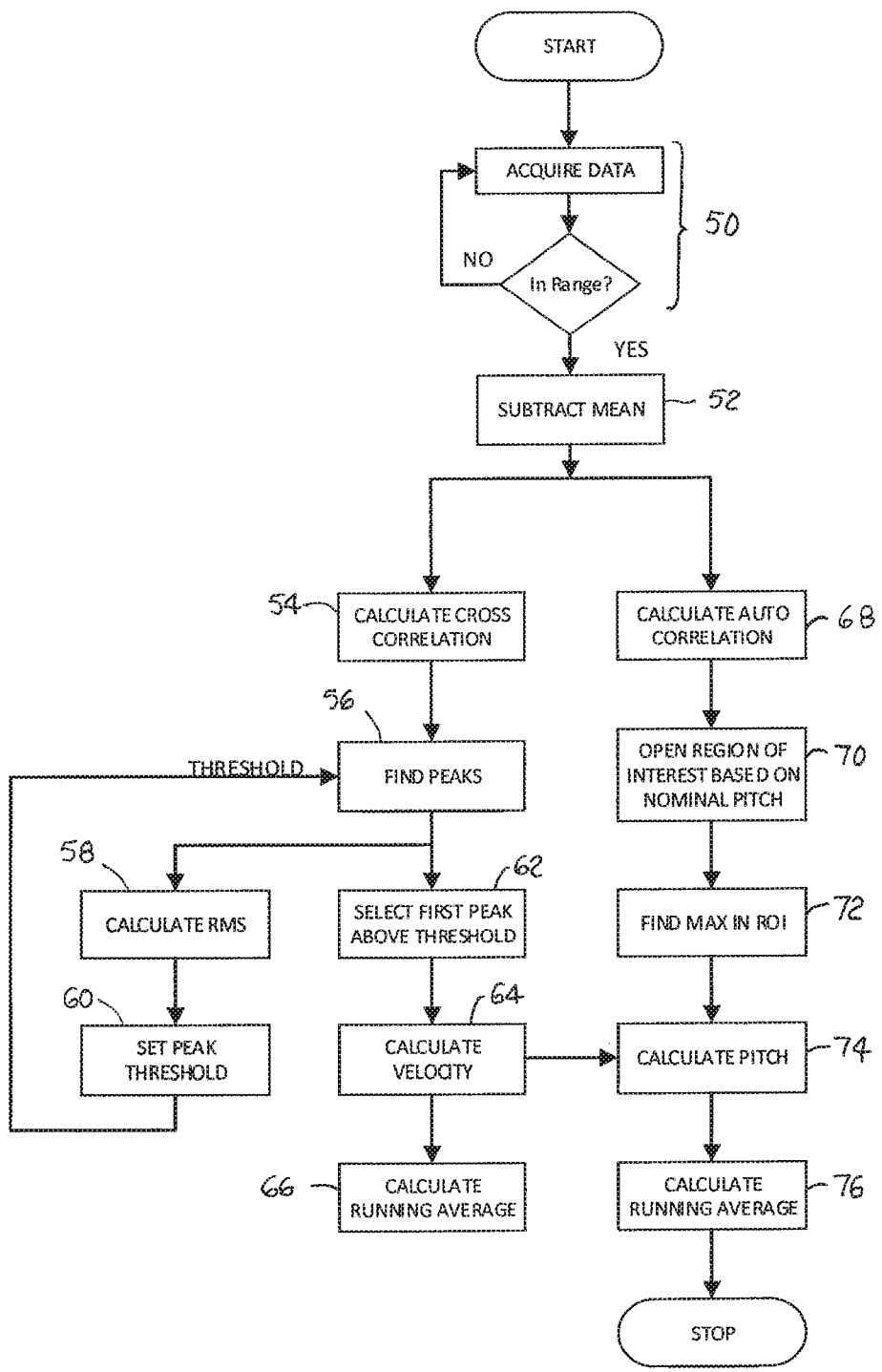
FIG. 5 is a flowchart of one version of a method for measuring belt pitch and speed using an apparatus as in FIG. 1.

The flowchart of FIG. 5 describes one method for determining the speed and pitch of a belt using correlation techniques. An executable program according to the flowchart and saved in the processor's program memory and executed by the processor (20, FIG. 1) controls the measurement cycle, performs the auto- and cross-correlations, computes the belt speed and the belt pitch, and performs other functions, such as accepting operator inputs and displaying or sounding alarms in the event of an impending belt failure or other alarm condition.

In acquiring measurement data at step 50, the processor reads the rangefinders and stores their distance measurements in buffers in the processor's data memory. From each of the two buffers the processor's program acquires a record of measurement data and checks to see if any measurements lie outside an acceptable range. If any value in the record is out of range, that record and the corresponding record of the other rangefinder's measurement data are discarded and new profile records are acquired. Both records are synchronized in time. The processor computes the mean value for each valid data record and subtracts the mean value from each measurement value at step 52 to produce zero-mean measurement records. The two zero-mean data profile records are then correlated with each other and themselves. The first rangefinder's measurement profile record is cross-correlated with the second rangefinder's profile record at step 54. A peak-finding routine finds all the peaks, i.e., all the relative maxima, in the cross-correlation at step 56. The processor computes the root-mean-square (rms) value of the cross-correlation at step 58. A peak threshold level is set at step 60 as a function of the rms value to eliminate peaks due to noise and distance measurements corresponding to other salient topographical belt features not of interest and to other belt features that produce high auto-correlation peaks, but are not located at the belt pitch distance. The peak threshold 46 is used at step 56 to find the peaks in the cross-correlation $R_{12}$ due to the salient belt feature of interest as shown in FIG. 3. The processor, at step 62, selects the first-occurring peak $P_{1X}$ above the threshold 46. The time delay $\tau_s$ of the occurrence of that peak from the start of the cross-correlation $R_{12}$ is used at step 64 to compute the belt velocity $v_b$ as $d_s/\tau_s$, where $d_s$ is the known rangefinder separation distance. If the belt speed is known a priori as measured by a different sensor or as reported by a belt-motor controller, the belt speed $v_b$ does not have to be computed as in step 64; and, in fact, the cross-correlation does not have to be performed and only one sensor is required. The belt speed $v_b$ computed for each profile record at step 64 or provided from another source can then be applied to a low-pass digital filter to provide a running average of the belt speed at step 66 to provide a better estimate of belt pitch by filtering out noise.

At step 68 the processor calculates the auto-correlation of the distance-measurement profile record of each rangefinder. Every auto-correlation function has an initial maximum peak at $\tau=0$. Because the next peak after the initial peak is expected to occur in the region of interest (44, FIG. 4), the processor opens that region of interest (ROI) in the auto-correlation at step 70. At step 72 the processor searches through the limited set of auto-correlation values in the region of interest (ROI) for the maximum value, which is assigned as the peak $P_{2A}$. The delay between the first peak $P_{1A}$ at $\tau=0$ and the second peak $P_{2A}$ is the time delay $\tau_p'$ that corresponds to the time interval between occurrences of consecutive topographical belt features of interest. The processor, at step 74, calculates belt pitch P as $v_b\tau_p'$ or as the product of the rangefinder separation distance $d_s$ and the ratio of the average of the first and second auto-correlation time delays $(\tau_{p1}'+\tau_{p2}')/2$ to the cross-correlation time delay $\tau_s$. Like the belt speed $v_b$, the belt pitch P can be filtered to produce a smoother running average at step 76. The processor then repeats the steps at a predetermined rate for a new set of distance measurements.

What is claimed is:

1. Apparatus for measuring belts, comprising:
    a first rangefinder making first distance measurements from the first rangefinder to a belt having a regularly spaced topographical feature and advancing at a belt speed in a direction of belt travel transverse to the distance between the first rangefinder and the belt;
    a processor receiving the first distance measurements from the first rangefinder and producing a first profile record of a predetermined number of sequential first distance measurements and determining the occurrences of the regularly spaced topographical feature in the first profile record;
    a second rangefinder making second distance measurements from the second rangefinder to the belt, wherein the second rangefinder is offset from the first rangefinder in the direction of belt travel by a separation distance;
    wherein the processor receives the second distance measurements, produces a second profile record of a predetermined number of sequential second distance measurements, and determines the occurrences of the regularly spaced topographical features in the second profile record.

2. Apparatus as in claim 1 wherein the processor determines the distance between consecutive positions of the regularly spaced topographical feature on the belt from consecutive occurrences of the regularly spaced topographical feature in the first profile record and the belt speed.

3. Apparatus as in claim 1 wherein the processor produces an auto-correlation of the first profile record and determines the distance between consecutive positions of the regularly spaced topographical feature on the belt from consecutive occurrences of the regularly spaced topographical feature in the auto-correlation of the first profile record and the belt speed.

4. Apparatus as in claim 1 wherein the processor computes the belt speed as the ratio of the separation distance to the time delay between the occurrence of the regularly spaced topographical feature in the first profile record and the occurrence of the same regularly spaced topographical feature in the second profile record.

5. Apparatus as in claim 1 wherein the processor produces a cross-correlation of the first profile record and the second profile record to determine a cross-correlation time delay between the occurrence of the regularly spaced topographical feature in the first profile record and the occurrence of the same regularly spaced topographical feature in the second profile record.

6. Apparatus as in claim 5 wherein the processor computes the belt speed as the ratio of the separation distance to the cross-correlation time delay.

7. Apparatus as in claim 5 wherein the processor produces a first auto-correlation of the first profile record to determine a first auto-correlation time delay between consecutive occurrences of the regularly spaced topographical feature in the first profile record.

8. Apparatus as in claim 7 wherein the processor computes belt pitch as the product of the separation distance and the ratio of the first auto-correlation time delay to the cross-correlation time delay.

9. Apparatus as in claim 7 wherein the processor produces a second auto-correlation of the second profile record to determine a second auto-correlation time delay between consecutive occurrences of the regularly spaced topographical feature in the second profile record.

10. Apparatus as in claim 9 wherein the processor computes belt pitch as the product of the separation distance and ratio of the average of the first and second auto-correlation time delays to the cross-correlation time delay.

11. Apparatus as in claim 7 wherein the processor assigns the time delay between the highest peak in the first auto-correlation and the highest peak in a predetermined later region of interest of the first auto-correlation as the first auto-correlation time delay.

12. Apparatus as in claim 11 wherein the predetermined later region of interest of the first auto-correlation spans an expected range of first auto-correlation time delays that depends on belt speed and pitch of the belt.

13. Apparatus as in claim 5 wherein the processor determines the rms value of the cross-correlation and sets a peak threshold as a function of the rms value and selects only peaks in the cross-correlation above the peak threshold as indicating possible occurrences of the topographical feature.

14. Apparatus as in claim 1 wherein the first and second profile records each span at least two occurrences of the regularly spaced topographical feature of the belt advancing past the first and second rangefinders.

15. A method for measuring a belt having a regularly spaced topographical feature, the method comprising:
    advancing a belt having a regularly spaced topographical feature in a direction of belt travel at a belt speed;
    making first measurements constituting a profile of the belt along its length;
    producing a first profile record of a predetermined number of sequential first measurements;
    determining the occurrences of the regularly spaced topographical feature in the first profile record;
    making second measurements offset along the length of the belt from the first measurements by a separation distance, wherein the second measurements constitute the profile of the belt;

producing a second profile record of a predetermined number of sequential second measurements; and determining the occurrences of the regularly spaced topographical feature in the second profile record.

16. The method of claim 15 further comprising producing a first auto-correlation of the first profile record to determine a first auto-correlation time delay between consecutive occurrences of the regularly spaced topographical feature in the first profile record, wherein the first auto-correlation time delay is proportional to belt pitch.

17. The method of claim 16 further comprising assigning the time delay between the highest peak in the first auto-correlation and the highest peak in a predetermined later region of interest of the first auto-correlation as the first auto-correlation time delay.

18. The method of claim 17 further comprising centering the predetermined later region of interest of the first auto-correlation on an expected first auto-correlation time delay that depends on belt speed and pitch of the belt.

19. The method of claim 15 further comprising computing the speed of the belt as the ratio of the separation distance to the time delay between the occurrence of the regularly spaced topographical feature in the first profile record and the occurrence of the same regularly spaced topographical feature in the second profile record.

20. The method of claim 15 further comprising:
defining an acceptable range of values for the first and second distance measurements;
discarding the first and second profile records if any one of the first or second distance measurements is outside the acceptable range of values.

21. The method of claim 15 further comprising producing a cross-correlation of the first profile record and the second profile record to determine a cross-correlation time delay between the occurrence of the regularly spaced topographical feature in the first profile record and the occurrence of the same regularly spaced topographical feature in the second profile record, wherein the cross-correlation time delay is inversely proportional to the belt speed.

22. The method of claim 21 further comprising computing the speed of the belt as the ratio of the separation distance to the cross-correlation time delay.

23. The method of claim 22 further comprising computing a running average of the speed of the belt.

24. The method of claim 21 further comprising:
determining the rms value of the cross-correlation;
setting a peak threshold as a function of the rms value; and
selecting only peaks in the cross-correlation above the peak threshold as indicating possible occurrences of the topographical feature.

25. The method of claim 21 further comprising:
computing a first mean of the first distance measurements in the first profile record;
computing a second mean of the second distance measurements in the second profile record;
subtracting the first mean from each of the first distance measurements to produce a zero-mean first profile record;
subtracting the second mean from each of the second distance measurements to produce a zero-mean second profile record;
using the zero-mean first and second profile records to produce the cross-correlation.

26. The method of claim 21 further comprising producing a first auto-correlation of the first profile record to determine a first auto-correlation time delay between consecutive occurrences of the regularly spaced topographical feature in the first profile record and computing belt pitch as the product of the separation distance and the ratio of the first auto-correlation time delay to the cross-correlation time delay.

27. The method of claim 26 further comprising computing a running average of the belt pitch.

28. The method of claim 26 further comprising producing a second auto-correlation of the second profile record to determine a second auto-correlation time delay between consecutive occurrences of the topographical feature in the second profile record, wherein the second auto-correlation time delay is proportional to belt pitch.

29. The method of claim 28 further comprising computing belt pitch as the product of the separation distance and ratio of the average of the first and second auto-correlation time delays to the cross-correlation time delay.

30. The method of claim 15 wherein the regularly spaced topographical feature is an inherent feature of the belt having a main function other than having its occurrences in the first belt profile determined.

* * * * *